United States Patent [19]

Logan

[11] 3,892,684

[45] July 1, 1975

[54] CLEAR FLEXIBILIZED EPOXY RESINS

[75] Inventor: Ted J. Logan, Cincinnati, Ohio

[73] Assignee: The Procter & Gamble Company, Cincinnati, Ohio

[22] Filed: Oct. 5, 1973

[21] Appl. No.: 404,078

Related U.S. Application Data

[60] Division of Ser. No. 299,491, Oct. 20, 1972, Pat. No. 3,792,018, which is a continuation-in-part of Ser. No. 195,455, Nov. 3, 1971, abandoned.

[52] U.S. Cl. ........... 260/2 N; 260/2 EP; 260/18 PF; 260/47 EN; 260/59; 260/78.4 EP; 260/79; 260/268 R; 260/309; 260/561 A; 260/584 B
[51] Int. Cl. ............................................. C08g 30/10
[58] Field of Search ................. 260/2 EP, 2 N, 2 EC

[56] References Cited
UNITED STATES PATENTS

| | | | |
|---|---|---|---|
| 3,029,286 | 4/1962 | Bressler et al. | 260/584 |
| 3,240,376 | 3/1966 | Smith et al. | 260/2 EP |

*Primary Examiner*—Morris Liebman
*Assistant Examiner*—T. Pertilla
*Attorney, Agent, or Firm*—Ronald L. Hemingway; Richard C. Witte; Julis P. Filcik

[57] ABSTRACT

A composition for producing clear, cured epoxy resins, said resins containing specified glycidyl ethers of propoxylated glycerine as flexibilizers, and being cured at room temperature.

3 Claims, No Drawings

CLEAR FLEXIBILIZED EPOXY RESINS

This is a division of application Ser. No. 299,491, filed Oct. 20, 1972, now U.S. Pat. No. 3,792,018, which application is a continuation-in-part of application U.S. Ser. No. 195,455, filed Nov. 3, 1971, and now abandoned.

BACKGROUND OF THE INVENTION

It is common practice in the epoxy resin industry to incorporate flexibilizers into epoxy resin compositions to improve the physical properties of the cured resin. The function of the flexibilizer is to impart some degree of resiliency and toughness to a normally rather rigid system and thereby to improve thermal shock and impact resistance of castings, improve peel strength of adhesives and increase the flexibility of films made from the resins. The conventional procedure for preparing flexibilized epoxy resins is to mix the base resin (e.g., the diglycidyl ether of bisphenol A) with the flexibilizer (e.g., the diglycidyl ether of polypropylene glycol) then to add a curing agent (e.g., diethylenetriamine) in sufficient amount to react with all, or nearly all of the oxirane oxygen groups in the mixture.

Belgian Pat. No. 756,055, issued Mar. 11, 1971 describes a particularly desirable flexibilizer which is a glycidyl ether of propoxylated glycerine. The flexibilizer is prepared by reacting glycerine and propylene oxide (or a polymer of propylene oxide) to form an intermediate reaction product and then reacting the intermediate with from about 2 to about 3.3 moles of epihalohydrin per mole of intermediate and effecting ring closure by dehydrohalogenation. These flexibilizers have between 2 and 3 oxirane oxygen linkages per mole of flexibilizer and, for purposes of convenience herein; will be called triepoxide flexibilizers. The above triepoxide flexibilizers wherein the molecular weight is between 1,500 and 2,500 are particularly useful since they impart outstanding toughness, structural integrity at elevated temperature, and chemical resistance to the cured resins containing them. It has been found, however, that this preferred triepoxide flexbilizer, when incorporated into an epoxy resin composition and cured at room temperature, (i.e., between about 5°C and 35°C) with the common room temperature curing agents (e.g., diethylenetriamine) generally gives an opaque cured resin. On the other hand, when high temperature curing agents (e.g., hexahydrophthalic anhydride) are used in these systems and curing is performed at high temperature (e.g., 120°C or higher), a clear cure is obtained.

For reasons of convenience and economy it is preferred that curing be accomplished at room temperature. Although the opaque flexibilized resins obtained by room temperature curing of resin compositions containing the 1,500 to 2,500 molecular weight triepoxide flexibilizer are useful and even desirable for many purposes, there are other instances (e.g., clear coatings, adhesives for laminating layers of clear glass, etc.) where a clear cured resin is required. The principal object of the present invention is to provide epoxy resin compositions containing triepoxide flexibilizers having a molecular weight of from about 1,500 to 2,500 wherein the cured resin obtained in room temperature curing is clear rather than opaque.

DESCRIPTION OF THE INVENTION

According to the present invention it has been surprisingly found that when a precondensate is formed between the 1,500 to 2,500 molecular weight triepoxide flexibilizer and a curing agent capable of curing an epoxy resin at room temperature, and this precondensate is then mixed with the base resin, and the mixture is allowed to cure at room temperature, a clear cured resin results. When using the conventional procedure of mixing the base resin and flexibilizer, followed by addition of curing agent and curing at room temperature, an opaque cured resin is formed. Likewise an opaque resin results when the base resin is mixed with the curing agent, followed by addition of the flexibilizer and curing at room temperature. Accordingly, the present invention provides (1) a novel process for preparing clear-cure flexibilized epoxy resins wherein a 1,500 to 2,500 molecular weight triepoxide is used as the flexibilizer and curing is accomplished at room temperature, (2) a novel composition of matter which consists essentially of the condensation product of said triepoxide flexibilizer and a room temperature curing agent and (3) a novel clear cured epoxy resin composition which is produced by the process herein. The clear cured resin composition prepared according to the present invention has substantial parity in physical and chemical properties to the corresponding opaque compositions prepared in the conventional manner (i.e., without precondensing the triepoxide flexibilizer and the curing agent). The triepoxide flexibilizers which are used in the present invention are described by the following general formula

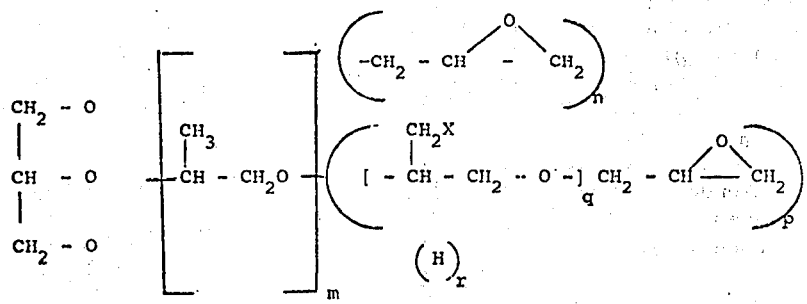

wherein X is chlorine or bromine, $n$ is a number from 1 to 3, the sum of $n + p$ is equal to from 2 to 3, $r$ is equal to from 0 to 1, the sum of $n + p + r$ is 3, and $m$, $n$, $p$ and $r$ are selected so as to give a molecular weight of from about 1,500 to about 2,500, and $q$ is an number from 0 to 1.3. The corresponding compounds wherein $$-CH \overset{O}{\diagup\diagdown} CH_2$$

is replaced by $$-\underset{|}{\overset{OH}{CH}} - CH_2X$$

wherein X is a chlorine or bromine can also be present in small amounts. At least two oxirane oxygens, and preferably three, are present per molecule of the flexibilizer (i.e., preferably $n + p = 3$). The flexibilizers of the invention are prepared by (1) reacting glycerine with propylene oxide (or propylene oxide polymer) to form an intermediate propoxylated glycerine (2) reacting the propoxylated glycerine with from about 2 to 3.3 moles of either epichlorohydrin or epibromohydrin per mole of propoxylated glycerine and (3) effecting ring closure by dehydrohalogenation in any conventional manner such as by reacting with sodium hydroxide. The degree of propoxylation of the glycerine is chosen so as to provide a reaction product of from 1,500 to 2,500 after reaction with the epihalohydrin and subsequent dehydro-halogenation. Although the flexibilizers of the invention can contain from two to three epoxide groups per mole, for purposes of simplicity and convenience they will be referred to herein as "triepoxides."

Any of the epoxy base resins having more than one 1,2-epoxy group which are useful in the formulation of epoxy resin compositions are useful in the present invention. Typical examples of the most widely used types of base resins are as follows: diglycidyl ether of bisphenol A, glycidyl ethers of novolac resins, glycidyl ethers of mononuclear di- and trihydric phenols, glycidyl ethers of polynuclear phenols, glycidyl ethers of aliphatic polyols, glycidyl esters, glycidyl epoxies containing nitrogen, thioglycidyl resins, silicon-glycidyl resins, fluorine-glycidyl resins, etc. Other suitable epoxy base resins include epoxy compounds derived from olefins, animal or vegetable oils, synthetic polyesters, unsaturated polyethers, etc.

The curing agents which are suitable for use in the invention are those of the stoichiometric type (as opposed to the catalytic type) which are capable of curing an epoxy resin at room temperature or lower, i.e., at a temperature of from about 35°C. to about 5°C. or lower. Stoichiometric curing agents contain active hydrogens and actually react with the epoxy compounds to form crosslinks, the reaction taking place on the basis of one active hydrogen of the curing agent per epoxide group of the epoxy compound. Catalytic curing agents, on the other hand, act by catalyzing direct reactions between the epoxide groups, and are not part of the present invention. Examples of stoichiometric, room temperature curing agents are as follows:

1. aliphatic polyamines, for example, diethylene triamine, bis(hexamethylene) triamine and triethylene tetramine
2. N-aminoethyl piperazine
3. Amidopolyamines which are formed from the reaction of carboxylic acids with aliphatic polyamines, e.g.,

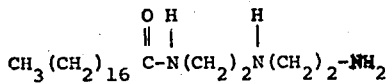

which is the product of the reaction of stearic acid with diethylene triamine.

4. substituted imidazoles, e.g., 2-ethyl-4-methyl imidazole.

Many other stoichiometric room temperature curing agents are known to those skilled in the art and are suitable for use in the invention herein.

The precondensate of triepoxide flexibilizer and room temperature curing agent which is essential to the practice of the invention herein is prepared by reacting the flexibilizer with the curing agent. The proportions of the two components are selected such that the amount of curing agent is sufficient to stoichiometrically react with the flexibilizer and to react with from about 75% to 125% (preferably from about 90% to about 110%) of the amount of epoxy base resin which is to be added to the precondensate to form the final epoxy resin composition.

The temperature condition under which the reaction between the triepoxide flexibilizer and curing agent is accomplished is not critical. The reaction can be accomplished at room temperature in which case from about 2 to about 24 hours is required. If desired the reaction time can be reduced to about 30 minutes or less by heating the reaction mixture. If the reaction mixture is heated to about 115°C it has been found that the reaction can be completed in about 15 minutes. Completion of the reaction can be determined by a negative result in a test for oxirane oxygen, e.g. the test described in an article by A. J. Durbetaki entitled "Direct Titration of Oxirane Oxygen with Hydrogen Bromide in Acetic Acid," *Analytical Chemistry*, Vol. 28, pages 2,000 – 2,001 (1956).

To form a clear, cured, flexibilized epoxy resin composition the precondensate is mixed with an epoxy base resin and the mixture is allowed to cure at room temperature. Room temperature curing normally takes from about 3 hours to about 7 days. Time needed for curing is not significantly affected by using the process of the invention rather than the conventional method of mixing the components of the resin. The proportions of precondensate and epoxy base resin are generally selected such that the triepoxide flexibilizer is present in the final cured resin composition at a level of from about 5 parts to 50 parts by weight per 100 parts by weight of the epoxy base resin. Preferably the flexibilizer is present at a level of about 5 parts to about 15 parts per 100 parts of base resin.

In a typical manner of practicing the invention, one first establishes the ratio of flexibilizer to base resin which he desires in the finished resin. He then calculates the amount of curing agent which will be required to react with all of the flexibilizer and all of the base resin. He reacts this amount of curing agent with all of the flexibilizer to form the precondensate, then mixes the precondensate with the base resin and allows the mixture to cure at room temperature.

As hereinbefore described, the present invention provides a process for preparing clear, cured, flexibilized epoxy resins, said process comprising the steps of:

A. reacting a triepoxide flexibilizer of the type hereinbefore described, and having a molecular weight of from about 1,500 to 2,500, with a room temperature curing agent, as hereinbefore described, to form a precondensate, the proportions of the reactants being such that the curing agent is present in sufficient amount to stoichiometrically react with the flexibilizer and with from about 75 to about 125% of the epoxy resin with which said precondensate is to be mixed in Step B.

B. mixing the precondensate of Step A with an epoxy base resin in proportions such that the resulting mixture contains from about 5 parts to about 50 parts by weight of triepoxide flexibilizer per 100 parts by weight of epoxy base resin, and C. curing the mixture of Step B at a temperature of 35°C or less to form a clear epoxy resin.

Although the obtaining of a clear cured resin is the primary benefit obtained by way of the present invention, certain other benefits are also obtained. For example, many of the curing agents are volatile liquids and their vapors are irritating or even hazardous to workers unless extensive protective precautions are taken. When said curing agents are precondensed with the flexibilizer in the manner prescribed by the present invention, their volatility is greatly reduced. Accordingly, the precondensates can be prepared and shipped by chemical manufactures to the resin formulator who can then formulate the finished resin with less exposure to the hazards normally associated with handling of the volatile curing agents. Those curing agents which are solids, are converted to liquid form when precondensed with the flexibilizer thus providing easier handling and measuring. Further, when the formulator uses a precondensate of the flexibilizer and curing agent, he has only two components to mix to form the final epoxy resins, instead of three.

The cured epoxy resin compositions of the invention can also contain additives which are conventional in epoxy resin technology, e.g., dyes, and diluents such as xylene, dibutyl phthalate, etc. Other flexibilizers and plasticizers including flexible epoxy resins, epoxy resins derived from aliphatic acids, hydroxyl-terminated flexibilizers, natural and synthetic rubbers, and resinous modifiers such as vinyl resins, polyester resins, etc. may also be incorporated into the compositions. Such additives, if used, are normally incorporated into the composition at the time the precondensate is mixed with the epoxy base resin, although they can, if desired, be incorporated into the precondensate. Since the compositions herein are clear, they do not contain substantial amounts of certain conventional epoxy resin components such as pigments, sand, clay, etc. which would render the compositions opaque.

The epoxy resin compositions of this invention find use in casting, potting, encapsulation, tooling, foams, adhesives, laminates, mono-filament reinforced structures, solventless coatings and many other applications. The invention will be further illustrated by the following examples.

EXAMPLE I

This example will illustrate the preparation of a triepoxide flexibilizer suitable for use in the invention.

REACTANTS

| 1530 | gm. | (1 mole) | Propylene oxide adduct of glycerin (Hydroxyl value = 110 mg KOH/gm material)* |
| 277.5 | gm. | (3 moles) | 1-chloro-2,3 epoxypropane |
| 7.6 | gm. | | Stannic Chloride |
| 240 | gm. | (6 moles) | Sodium Hydroxide (as a 30% solution) |

* A commercial grade of propoxylated glycerine purchased from Jefferson Chemical Co. of Houston, Texas, containing approximately 25 propoxide units per mole.

PROCEDURE

The 1-chloro-2,3 epoxypropane was added dropwise to a stirred flask containing the propylene oxide adduct of glycerin and stannic chloride over a period of 45 minutes. The reaction flask was cooled with cold water to keep the maximum temperature reached during addition below 55°C. The reaction mixture was stirred for 45 minutes after completion of the addition step.

120 grams of sodium hydroxide, as a 30% aqueous solution, was added to the product of the addition step. The mixture was heated to 90°C and stirred for 2 hours. The mixture was allowed to separate into two layers and the water layer was drained off. This procedure was repeated with another 120 grams of sodium hydroxide (30% solution).

The nonaqueous layer from the second sodium hydroxide treatment was washed with water until neutral and dried under a vacuum of 10 mm Hg at a temperature of 100°C.

The finished product had the following analyses:

| Oxirane Oxygen | 2.4% |
| Organic Chloride | 0.6% |
| Hydrolyzable Chloride | 0.2% |
| Moisture | 0.08% |
| Average Molecular weight | 1800 |
| Epoxide equivalent weight | 668 |

EXAMPLE II

The following epoxy resin compositions were prepared, the amounts of the components being expressed in parts by weight.

| | A | B | C | D | E | F | G |
|---|---|---|---|---|---|---|---|
| DETA[1] | 11.1 | 11.3 | 11.7 | 10.9 | 11.1 | 11.3 | 11.7 |
| Flexibilizer[2] | 5.0 | 10.0 | 20.0 | — | 5.0 | 10.0 | 20.0 |
| Base resin[3] | 100.0 | 100.0 | 100.0 | 100.0 | 100.0 | 100.0 | 100.0 |

[1] diethylenetriamine
[2] the triepoxide flexibilizer of Example I
[3] Epon 828 (diglycidyl ether of bisphenol A having an epoxide equivalent weight of about 185-192) purchased from Shell Chemical Co. New York, N.Y.

Compositions A, B and C were prepared by mixing the base resin and flexibilizer together, then adding the DETA curing agent. Composition D does not contain a flexibilizer and was prepared by mixing the curing agent with the base resin. Formulas E, F and G were made according to the invention by first reacting the DETA and flexibilizer at 115°C. for 15 min. to form a precondensate, then mixing the precondensate with the base resin at room temperature. All of the epoxy resin compositions were allowed to cure at room temperature and were tested 7 days after they were prepared. Compositions A, B and C were opaque after curing, whereas Compositions D, E, F and G were clear. The cured compositions were milled to standard dimensions and all testing was according to the procedures specified in ASTM Standards, Plastics-Methods of Testing, Part 27, except for the light transmittance test which was performed in the following manner.

A cured sample of Composition D having a thickness of 0.25 inches was placed against the aperture of a photographic light meter. A monochromatic source of light was directed onto the sample and adjusted to a distance which gave a reading of 100 foot candles on the meter. Keeping the light at this fixed distance, 0.25 inch thick samples of the other cured compositions were placed over the aperture and transmittance readings in foot candles were taken.

Results obtained on the cured resin samples are shown in the following table.

|  | A | B | C | D | E | F | G |
|---|---|---|---|---|---|---|---|
| Tensile Strength (PSI) | 8911 | 10,494 | 7908 | 3713 | 7444 | 9591 | 7259 |
| % Elongation (%) | 3.7 | 6.0 | 5.5 | 3.0 | 2.6 | 6.6 | 8.2 |
| Izod Impact Strength (ft.lbs./in.) | 0.48 | 0.70 | 0.63 | 0.18 | 0.55 | 0.48 | 0.82 |
| Heat Deflection Temperature (°C) | 67 | 88 | 74 | 57 | 104 | 59 | 56 |
| Light Transmittance (ft. candles) | 77 | 33 | 15 | 100 | 100 | 100 | 100 |
| Chemical Stability (% weight gain in 1 week) | | | | | | | |
| 30% $H_2SO_4$ | 0.89 | 0.99 | 1.84 | 0.74 | 1.1 | 0.88 | 0.86 |
| $H_2O$ | 0.18 | 0.33 | 0.74 | 0.40 | 0.30 | 0.43 | 0.65 |
| 30% NaOH | −0.18 | −0.28 | −0.04 | −0.1 | −0.07 | −0.02 | −0.04 |
| Acetone | 29.3 | 30.6 | >35 | 28.0 | 29.9 | >35 | >35 |
| Appearance | opaque | opaque | opaque | clear | clear | clear | clear |

These results show that the flexibilized resin compositions made according to the present invention (Compositions E, F and G) are clear and transparent and at the same time have substantial overall parity in other properties to comparable flexibilized resin compositions made according to the conventional procedure (Compositions A, B and C), which are opaque.

EXAMPLE III

An experiment similar to that in Example II was performed, substituting TETA (triethylene tetramine) on an equal active hydrogen basis for DETA. The compositions prepared were as follows, the amounts of the components being expressed in parts by weight.

|  | H | J | K | L | M | N | O |
|---|---|---|---|---|---|---|---|
| TETA | 13.1 | 13.3 | 13.7 | 12.9 | 13.1 | 13.3 | 13.7 |
| Flexibilizer[1] | 5.0 | 10.0 | 20.0 | — | 5.0 | 10.0 | 20.0 |
| Base resin[2] | 100.0 | 100.0 | 100.0 | 100.0 | 100.0 | 100.0 | 100.0 |

[1] The triepoxide flexibilizer of Example I
[2] Epon 828 (diglycidyl ether of bisphenol A having an epoxide equivalent weight of about 185–192) purchased from Shell Chemical Co. of New York, N.Y.

Compositions H, J and K were prepared by mixing the base resin and flexibilizer together, then adding the TETA curing agent. Composition L does not contain a flexibilizer and was prepared by mixing the curing agent with the base resin. Formulas M, N and O were made according to the invention by first reacting the TETA and flexibilizer at 115°C for 15 minutes to form a precondensate, then mixing the precondensate with the base resin at room temperature. All of the epoxy resin compositions were allowed to cure at room temperature and were tested 7 days after they were prepared. Compositions H, J and K were opaque after curing, whereas Compositions L, M, N and O were clear. The cured compositions were tested in the same manner as those of Example II, except tests for light transmittance and chemical stability were not run. Results are shown in the following table.

The following curing agents are substituted on an equivalent active hydrogen basis for TETA in the above experiment and substantially similar results are obtained in that clear cures are obtained when flexibilizer and curing agent are precondensed before mixing with the epoxy base resin and opaque cures are obtained when said precondensation is not done: bis (hexamethylene) triamine, N-aminoethyl piperazine, the amide formed by the reaction of one mole of stearic acid with 1 mole of diethylene triamine, and 2-ethyl-4-methyl imidazole.

The following epoxy base resins are substituted for the Epon 828 in the above experiment on an equal epoxide equivalent weight basis and substantially similar results are obtained in that clear cures are obtained when flexibilizer and curing agent are precondensed before mixing with the epoxy base resin and opaque cures are obtained when said precondensation is not done: polyglycidyl ether of phenolformaldehyde novalac resin having an epoxide equivalent weight of 176 to 181, diglycidyl ether of resorcinol having an epoxide equivalent weight of about 110, triglycidyl ether of trihydroxy biphenyl having an epoxide equivalent weight of 144, triglycidyl ether of trimethylol propane, having an epoxide equivalent weight of 100, diglycidyl ester of linoleic dimer acid having an epoxide equivalent weight of 390 to 470, the diglycidyl ether of tetrafluorobisphenol A having an epoxide equivalent weight of about 180, triglycidyl ether amine of para-aminophenol, diglycidyl ether of 1,12-dimercapto dodecane having an epoxide equivalent weight of about 175 and 1,4-bis [(2,3 epoxy propoxy) dimethyl silyl] benzene having an epoxide equivalent weight of about 170.

What is claimed is:

|  | H | J | K | L | M | N | O |
|---|---|---|---|---|---|---|---|
| Tensile Strength (PSI) | 9588 | 8665 | 7825 | 9055 | 9470 | 9719 | 6776 |
| % Elongation (%) | 5.3 | 7.2 | 5.5 | 5.3 | 4.4 | 5.8 | 9.5 |
| Izod Impact Strength (ft. lbs./in.) | 0.30 | 0.47 | 0.61 | 0.24 | 0.24 | 0.45 | 0.48 |
| Heat Deflection Temp. (°C) | 61 | 61.5 | 60.5 | 62 | 59 | 59 | 48 |
| Appearance | opaque | opaque | opaque | clear | clear | clear | clear |

1. A precondensate for use in preparing clear flexibilized epoxy resin compositions, consisting essentially of A. triepoxide flexibilizer having the formula

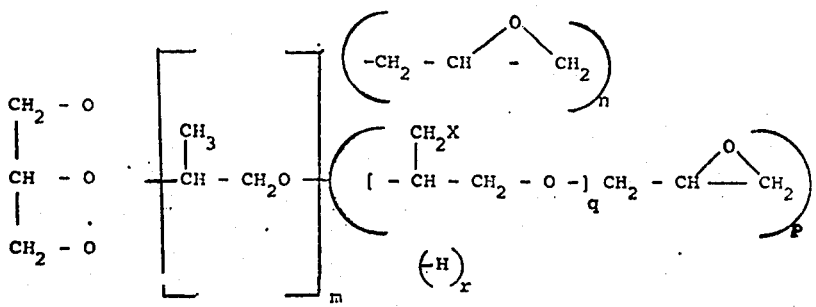

wherein X is chlorine or bromine, $n$ is a number from 1 to 3, the sum of $n + p$ is equal to from 2 to 3, $r$ is equal to from 0 to 1, the sum of $n + p + r$ is 3, and $m, n, p$ and $r$ are selected so as to give a molecular weight of from about 1,500 to about 2,500, and $q$ is a number from 0 to 1.3, and B. a stoichiometric type curing agent capable of curing epoxy resins at temperatures of 35°C or lower, the proportions of A and B being such that B is present in sufficient quantity to react stoichiometrically with all of A and with from about 75% to about 125% of an epoxy base resin when said epoxy base resin is mixed with said precondensate in such proportion that from about 5 to about 50 parts by weight of flexibilizer are present per 100 parts by weight of epoxy base resin.

2. The precondensate of claim 1, wherein the curing agent is selected from the group consisting of aliphatic polyamines, N-aminoethyl piperazine, amidopolyamines which are formed by the reaction of carboxylic acids with aliphatic polyamines and substituted imidazoles.

3. The precondensate of claim 2, wherein the curing agent is selected from the group consisting of diethylene triamine, bis(hexamethylene) triamine and triethylene tetramine.

* * * * *